United States Patent
Coelho et al.

(10) Patent No.: US 9,680,529 B2
(45) Date of Patent: Jun. 13, 2017

(54) ELECTRONICALLY ENABLED IN-PERSON SOCIAL NETWORKING

(71) Applicant: Marcelo Coelho Studio, LLC, Cambridge, MA (US)

(72) Inventors: Marcelo Henrique Coelho, Boston, MA (US); Alan Argondizza, Cambridge, MA (US)

(73) Assignee: Marcelo Coelho Studio, LLC, Cambridge, MA (US)

( * ) Notice: Subject to any disclaimer, the term of this patent is extended or adjusted under 35 U.S.C. 154(b) by 56 days.

(21) Appl. No.: 14/567,378

(22) Filed: Dec. 11, 2014

(65) Prior Publication Data

US 2015/0171926 A1 Jun. 18, 2015

Related U.S. Application Data

(60) Provisional application No. 61/915,112, filed on Dec. 12, 2013, provisional application No. 62/064,472, filed on Oct. 16, 2014.

(51) Int. Cl.
*H04B 5/00* (2006.01)
*G06Q 50/00* (2012.01)

(52) U.S. Cl.
CPC ........... *H04B 5/0025* (2013.01); *G06Q 50/01* (2013.01)

(58) Field of Classification Search
CPC ............................. G06Q 50/01; H04B 5/0025
See application file for complete search history.

(56) References Cited

U.S. PATENT DOCUMENTS

| | | | |
|---|---|---|---|
| 7,538,745 B2 | 5/2009 | Borovoy et al. | |
| 7,688,211 B2 | 3/2010 | Borovoy et al. | |
| 8,359,643 B2* | 1/2013 | Low | H04W 4/08 370/254 |
| 8,554,292 B1 | 10/2013 | Alsaffar | |
| 8,612,357 B2 | 12/2013 | Phillips | |
| 8,787,006 B2 | 7/2014 | Golko et al. | |
| 2007/0198324 A1 | 8/2007 | Borovoy et al. | |
| 2009/0102645 A1 | 4/2009 | Borovoy | |
| 2010/0112991 A1* | 5/2010 | Hannaby | H04M 1/2155 455/414.3 |
| 2011/0177802 A1* | 7/2011 | Gupta | H04L 12/66 455/418 |
| 2011/0179124 A1 | 7/2011 | Fielding, Jr. | |
| 2011/0191352 A1* | 8/2011 | Jones | G06F 17/30 707/749 |
| 2014/0095618 A1* | 4/2014 | Larson | H04L 67/16 709/204 |

* cited by examiner

*Primary Examiner* — David Bilodeau
(74) *Attorney, Agent, or Firm* — Adams Intellex, PLC

(57) ABSTRACT

Techniques and devices for electronically enabled in-person social networking are disclosed. A device is worn on a first user's wrist or otherwise placed on or near a first user. The device is associated with the user and a user profile is established. When another user wearing or holding a similar device comes in close proximity to the first user, the profiles of the two users are compared to see if any attributes from both users' established profiles have a strong correlation or match. If so, an indication is displayed on the device, indicating to both users that a match between the two users has been determined.

28 Claims, 10 Drawing Sheets

ELECTRONICALLY ENABLED IN-PERSON SOCIAL NETWORKING

RELATED APPLICATIONS

This application claims the benefit of U.S. provisional patent applications "Device and System for In-Person Social Networking" Ser. No. 61/915,112, filed Dec. 12, 2013 and "Extended Device and System for In-Person Social Networking" Ser. No. 62/064,472, filed Oct. 16, 2014. The foregoing applications are each hereby incorporated by reference in their entirety.

FIELD OF ART

This application relates generally to social networking, and more particularly to electronically enabled in-person social networking.

BACKGROUND

Social networking has become an important part of modern life. In both pleasure and business applications, social networking enables people to meet other people with mutual interests. There are numerous social networking websites where users build profiles that help to describe their interests, as well as allowing the users to describe or elaborate the types of relationships they are looking to build. In order to facilitate interpersonal discovery, social networks can link people together through mutual connections, such as suggesting a connection based on one party being a "friend of a friend" of the other, or another relationship between the two potential connections.

Such a network of person-to-person relationships forms the foundation of what are generally referred to as social networks. However, the mapping of individual relationships is far more complex than simply connecting two individuals based on a common interest. Imagine, for example, social network participants as nodes on a graph, with the number of segments (intermediate participants) needed to link one participant to another representing the degrees of separation between those two participants. Profile information that the social network can be configured to store for each user is often used to build a web of potential contacts beyond the first degree of separation for users. The social network provider can also create a social network (a list of contacts) for a user by tracking user-to-user communication, pursing user created contact lists or address books, or allowing users to explicitly create their own networks.

Furthermore, participants in a social network can often establish an affiliation with one or more specific groups (clubs, working groups, professional associations, etc.), which can have a separate group profile to convey information about the group, such as the purpose or charter of the group. In particular, in addition to sharing affiliation in the group (e.g., sharing similar interests, businesses, organizations, etc.), members of a group can access the otherwise closed profiles of other members of that same group based on group policies. Typically, affiliation with a particular group occurs on an individual participant basis.

In the realm of friendships, people often seek out other people with similar interests, such as music, sports, or art. In some cases, people seek someone with a certain character trait or skill set for a specific purpose, even if it is a trait the seeker does not necessarily share. For example, a piano player might look for a bass player in order to form a band. In the realm of business, a mixture of common and complementary factors is often important. For example, an entrepreneur might simultaneously seek out a software developer, an investor, and an attorney in order to construct a well-rounded team for a certain project. Furthermore, the entrepreneur might stipulate that all of the persons sought share a common interest (e.g. cloud computing) in addition to the individuals' different, complementary skill sets. In these and numerous other scenarios, social networking represents a powerful tool for allowing the interested parties to find each other. Social networks can also provide mechanisms for tracking online reputations, and can help various interconnected users estimate how much to trust one another, especially when the users have not interacted previously in person. By making the introduction process more efficient, professional and personal relationships are improved. And although many introductions and relationships can be started between participants online, there is still no substitute for a certain level of in-person interaction.

SUMMARY

Social networking via online websites facilitates introductions of interested parties. In a personal realm this can include applications such as online dating. In a professional realm, people seeking other people with similar interests or needed skills can utilize social networking to accelerate the process of finding those people with complementary or desired skills. Personal interactions can also benefit from the ability to understand and appreciate the skills and attributes of a person or people before a physical conversation has been initiated. To this end, embodiments of the present disclosure provide a hardware device that associates profile information with a user. The hardware device can be a wearable device such as a wristband. The hardware device can include a band for wrapping around a cup. The device can detect the presence of other devices nearby, perform a comparison of information based on user profiles, and indicate a match if one exists. In this way, at a social gathering such as a dance or business conference, people can quickly ascertain the likelihood of a successful and meaningful introduction with the people around them by reviewing the indication provided by the device.

In embodiments, an apparatus for communication includes: a device associated with and in close proximity with a first participant comprising: a wireless transceiver; a display coupled to the wireless transceiver where the display renders information about a neighboring participant; evaluation logic coupled to the wireless transceiver that enables match evaluation between a person and the neighboring participant based on profile related information received via the wireless transceiver; and display logic that enables rendering of the match evaluation on the display. A second device can be associated with the neighboring participant. The information about the neighboring participant can include commonality information. In some embodiments, a processor-implemented method for communication comprises: receiving profile information on a first person; comparing the profile information on the first person with profile information on a second person; evaluating a match between the first person and the second person, based on the comparing; rendering results, based on the evaluating of the match, on a plurality of devices in wireless communication with each other where a first device, from the plurality of devices, is in close contact with the first person and a second device, from the plurality of devices, is in close contact with the second person and where the first device and the second device are within proximity of one another and where the first device and the second device exchange data.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
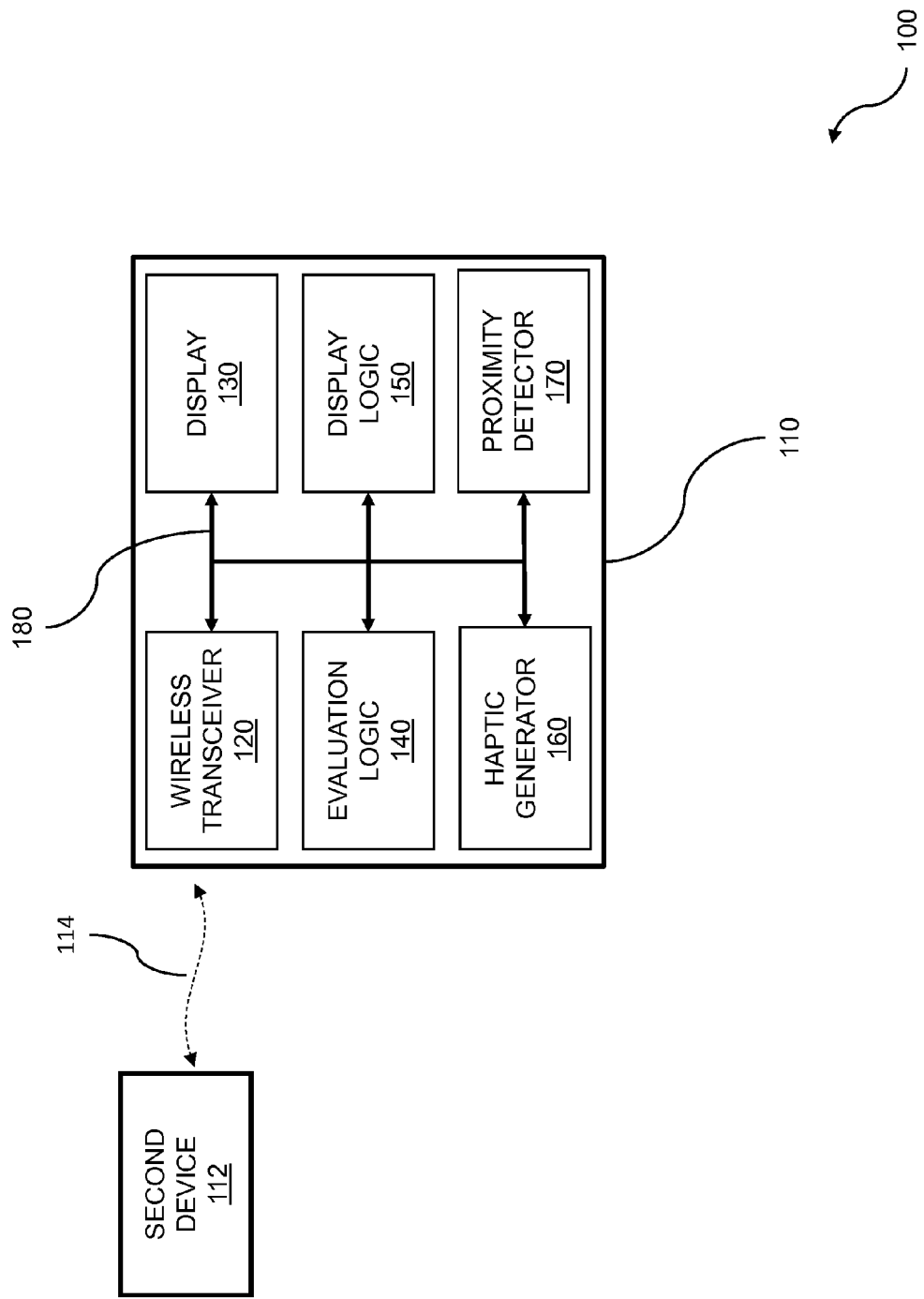
FIG. 1 shows a device for electronically enabled in-person social networking.

Social gatherings often are the origin and/or catalyst of lasting friendships and successful business endeavors. Individuals and groups with potential mutual compatibility can meet in various social settings, such as fundraisers, conferences, conventions, and other social events (holiday parties, birthdays, etc.). Disclosed embodiments provide devices, systems, and methods for facilitating introductions and gatherings of compatible people. An electronic device is associated with a user. The user establishes, or has previously established, a profile which comprises multiple attributes and is stored on the electronic device. The electronic device is thus associated with a user and the user's attributes. In a social gathering, multiple users can each have a similar electronic device in close contact. The electronic devices detect when they are within close proximity of each other and can react to the proximity by evaluating a potential match between the user profiles contained on the devices. For example, certain embodiments include evaluation logic which only performs match evaluation in response to a second device being within a certain proximity to the first device. Upon detecting close proximity of each other, the devices make a connection and the users become associates (i.e. the first user becomes a neighbor who is participating with the second user and vice-versa) and an indication is provided if the two users are determined to have compatibility with one another. In some embodiments, the compatibility can be based on similar interests such as a mutual interest in sports. In other embodiments, the compatibility can be based on complementary attributes, with the potential compatibility representing mutually beneficial roles such as an investor being matched with an entrepreneur seeking investments. In still further embodiments, the device comprises a wearable device such as a wristband or lapel pin, or is integrated as part of a beverage container such as a cup or bottle. In some cases the cup or bottle can have a band wrapped around it that incorporates the device. In the case of wristbands, when two devices are in close proximity (e.g. within 24 inches of each other) such as during a handshake between the two wearers, the devices can indicate if a match exists between the two people based on predetermined criteria. Seeing the match confirmation on the device serves to facilitate additional conversation and allows "ice-breaking" to occur between the two users, removing potential obstacles in further developing social and/or business relationships.

The disclosed embodiments can improve in-person networking across a variety of situations. In a business setting, for example, not only can entrepreneurs be matched with investors, as previously mentioned, but individuals representing numerous roles within a company or organization can benefit from both in-house and external matching with other individuals possessing complementary and team-improving skillsets. In the social sphere, the current disclosure's relevance to a dating application will be immediately appreciated as dating applications frequently involve attempts to facilitate easy and natural introductions between people with common interests. Any type of commonality information can be included to facilitate matching, such as shared interests, geographical location, and other demographic similarities which can be retrieved from stored profile information and compared. A certain amount of similar information detected between two parties can trigger an indication of a match on each of the portable devices the persons wear or keep in close contact with themselves. Many other examples and applications are possible.

FIG. 1 shows a system 100 which includes an apparatus for communication, including a device 110 for electronically enabled in-person social networking. The system 100 includes a device 110 associated with and in close proximity with a first participant comprising: a wireless transceiver 120 and a display 130 (e.g. an LED) coupled to the wireless transceiver where the display renders information about a neighboring participant and in particular information about a relationship or matching between the first participant and the neighboring participant. The wireless transceiver, display, and other components can communicate via internal bus or wire 180. The internal bus 180 can include an internal bus, an i2C bus, or other suitable technology. The rendering of results can facilitate in-person interaction. In embodiments, the wireless transceiver 120 comprises an ANT+™ transceiver. Other embodiments may include, but are not limited to, a Zigbee® transceiver, an infrared transceiver, a near field communication (NFC) transceiver, XBee®, and/or a Bluetooth® transceiver. The display 130 can comprise a plurality of colored lights. In embodiments, the display 130 can include, but is not limited to, one or more light-emitting diodes (LEDs), a liquid crystal display (LCD), an organic light emitting diode (OLED) display, or other suitable technology. In particular embodiments, a plurality of LEDs are used, wherein each LED illuminates in a different color. The colors can be associated with a characteristic. The information about the neighboring participant can include commonality information. The information can be obtained by users answering specific questions on a computer, mobile device, or other device connected to a server or special purpose device. The information can also be gleaned via collecting data from social networking sites, public information, and other sources. The characteristics can be based on questions that the user answers using a computer via, in one embodiment, a kiosk computer that is present at a social event. When a user enters the event, they answer multiple profile questions on the kiosk, and register the device 110 that the user will keep on his or her person during the event. The profile questions can be used to obtain commonality information. The commonality information can reflect how similar two users are to each other in certain aspects. In embodiments, the questions are scored numerically by the user. For example, in a social scenario, three profile questions such as the following can be presented to a user:

Q1 Do you like movies?
Q2 Do you like sports?
Q3 Do you like music?

The user rates each question on a numerical scale (e.g. 0-100). For example, if user A likes movies very much, and is mildly interested in sports with little interest in music, the scoring for each question by user A might be:

$$Q1=95, Q2=50, Q3=11.$$

Suppose then that another user, user B, likes movies, but has little interest in sports or music. In this case, user B might score the questions as: Q1=93, Q2=10, Q3=8. Remember that user B has his or her own portable device, which stores the answers to the questions. The users can enter the information into the kiosk computer via direct numerical entry, sliders, or another suitable method. The physical proximity of two users' devices to each other as detected by a proximity detector 170, can trigger each user's device to exchange profile information such as numerical question response values via a wireless or wired communication link. The exchange, for example, can include an exchange of both user A and user B's personal identification information in addition to the question scores. A comparison between the scores is performed, and if, for a given question, the scores from user A and user B are within a predetermined threshold, e.g. a threshold of 80%, the question can be deemed to match for the two users, and the display of each user's device can be activated accordingly.

In some embodiments, a color-coding system can be implemented on the devices to facilitate easy and intuitive discovery of a match. For example, question 1 (Q1), asking about movies, can be associated with the color red, question 2 (Q2), asking about sports can be associated with the color green, and question 3 (Q3), asking about music, can be associated with the color blue. Thus, in the aforementioned example, since user A and user B (user B is considered a neighboring participant of user A when user A and user B are within close proximity of each other) have scores that represent a match for Q1 and Q3 according to predetermined criteria, then the red and blue LEDs on each user's device can illuminate, signaling to each user that they share similar feelings about movies and music. In some cases, only comparable high scores would be considered a match while in other cases a pair of comparable low scores would also be considered a match. In some embodiments, matching could incorporate an algorithm combining (e.g. summing) scores across multiple questions to determine a match. While this example used three questions and three colors, other embodiments can use more questions and colors to facilitate the in-person social networking. In embodiments, proximity detector 170 can include an infrared transceiver, magnetic detector, RF detector, optical sensor, or other suitable technology.

In alternative embodiments, instead of scoring questions with a numerical value, a yes/no answer is solicited for each question. In an example using the previously mentioned questions, two users answer as follows:

USER A:
Q1 Do you like movies? YES
Q2 Do you like sports? NO
Q3 Do you like music? YES USER B:
Q1 Do you like movies? NO
Q2 Do you like sports? NO
Q3 Do you like music? YES In this example, the preferences of each user are encoded as a binary string where a NO answer equates to a binary 0 and a YES answer equates to a binary 1. Thus, for user A, his or her profile is represented by the binary string (1,0,1), and for user B, his or her profile is represented by the binary string (0,0,1). Hence in this embodiment, when user A and user B place their respective devices (e.g. wristbands) in close proximity to each other the second question (Q2) and third question (Q3) evaluate to a match, since both user A and user B have the same answers for those questions stored in their profiles. In some embodiments, only YES answers evaluate to a match. In embodiments of the current example where only YES matching is implemented, the third question (Q3) evaluates to a match. Based on which questions evaluate to a match, corresponding colored lights (e.g. LEDs) can illuminate to indicate the match to the users. In some embodiments, the yes/no questions can be given different weights to represent different degrees of importance. In some embodiments, the user's answer to a question determines the next question posed to them. For example, if a user answers YES to the question "Do you like movies?" then the next question might be "Do you like horror movies?" Similarly, if the user answers NO to "Do you like movies?" then the next question might be "Do you like books?" In this manner, customized profiles for each user can be established. In embodiments, two devices are deemed to match if they have more than a certain number of shared responses. This can mean executing matching if two units have at least one response in common, or, as another example, it can mean executing matching if two units have at least ten responses in common.

The device 110 includes evaluation logic 140 coupled to the wireless transceiver 120 that enables match evaluation between a person and a neighboring participant based on profile-related information received via the wireless transceiver 120. The evaluation logic 140 can include a processor which compares the scored responses to the questions of the user with the scored responses of a neighboring participant (another user with a device in close proximity to the device of the first user). In embodiments, the processor is embodied in a single chip including an ARM microcontroller and a radio transceiver including both Bluetooth® and ANT+™ protocols. A coin cell battery (e.g. CR2032) can be used to power the device. Information can be exchanged between the two devices, such that the first user's device obtains information from the neighboring participant's device. The information about the neighboring participant can include commonality information. The evaluation logic 140 can use profile information received via the wireless transceiver 120. In embodiments, the profile information includes profile questions answered by the user. The profile information on a first user and the profile information on a second user can be based on social network information. Thus, in some embodiments, profile information from a social media website such as Facebook, LinkedIn™, or the like, can be received via the wireless transceiver 120.

The device 110 further includes display logic 150 that enables rendering of the match evaluation on the display. The display logic activates an appropriate display based on the matching. Different-colored LEDs can each represent one of the profile questions, and questions that are within a predetermined threshold (e.g. scores within 10 points of each other) are considered as matches and the appropriate LEDs are illuminated.

The device 110 can further comprise a haptic actuator or haptic generator 160 that provides haptic feedback to the first participant. In embodiments, the haptic generator 160 can include a vibrator. The vibrator can be implemented using a small vibrating motor. In embodiments, the haptic generator 160 is configured to activate upon detection of a second device 112 in close proximity to the first device in which the haptic generator 160 is housed. In embodiments, being in close proximity includes being within a distance with an upper limit ranging from about six inches to about 18 inches. In other embodiments, close proximity can include a distance between devices that is less than 3 feet. The haptic generator can also be used to privately communicate to the user information that is not displayed. In some embodiments, the haptic generator indicates that a match has been detected. The device 110 communicates with the second device 112 via a communications link 114. In embodiments, the communications link 114 includes an infrared transceiver. In other embodiments, the communications link 114 can include, but is not limited to, Bluetooth®, Xbee®, and/or ANT+™ transceivers.

The device 110 can further comprise an audio component that provides sound feedback. The audio component can include a speaker or buzzer such as a piezoelectric buzzer. The device 110 can further comprise a biometric sensor where information from the biometric sensor is communicated with the neighboring participant. The biometric sensor can include, but is not limited to, capturing pulse rate, skin temperature, and electrodermal activity. The captured data can be used to assess the emotional state of a person or group of people. The emotional state can be determined, for instance, by heart rate or arousal evaluation.

In embodiments, a complementary role is used as a first pass filter. For example, a certain dating scenario might include a heterosexual male is looking for a heterosexual female. In this embodiment, if the heterosexual male user's device comes in proximity with another user's device containing a stored role that does not match (e.g. homosexual female) no further evaluation is performed. That is, a user's role is first checked before any match evaluation is indicated. Thus, if the role does not match what the user is seeking, no further evaluation is performed.

Figure 2:
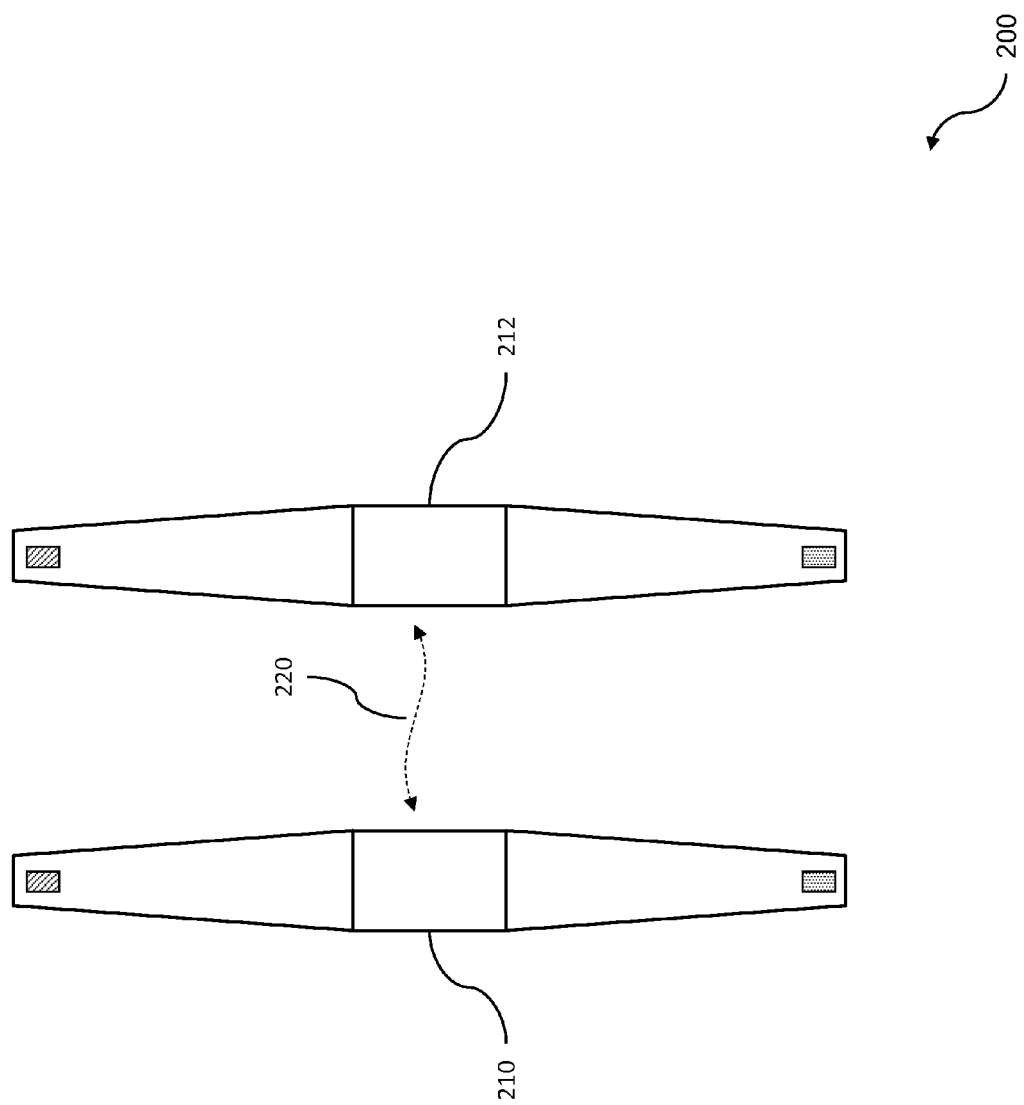
FIG. 2 illustrates wristband to wristband communication.

FIG. 2 is a diagram 200 illustrating wristband to wristband communication. In embodiments, a first wristband 210 and a second wristband 212 detect each other through a wireless communication link 220. One wristband 210 can be worn by and associated with a first user and another wristband 212 can be worn by and associated with a neighboring second user. When the first wristband 210 and the second wristband 212 are in close enough proximity (e.g. within 18 inches of each other) then the second wristband 212 becomes a neighboring participant of the first wristband 210 and vice-versa. In embodiments, the first wristband 210 is worn on the wrist of a first user, and the second wristband 212 is worn on the wrist of a second user, though other device arrangements are also possible. When the first and second users greet each other with a handshake, first bump, or other salutation that puts the users' hands in close proximity, the two users become neighboring participants and exchange information. The data which is exchanged between the first device 210 and the second device 212 can communicate proximity information and an identifier. And, as shown, the first device can be a wearable device. The exchanged information can further include other data, such as profile data, which can be compared with the local profile data on the user's device. The information can be exchanged via infrared light; that is, the first device 210 and the second device associated with the neighboring participant 212 can communicate via infrared light. The underside of the wristband can include a label that has a QR code or barcode that encodes identification information (not shown).

In embodiments, the evaluation logic 14 of FIG. 1 only performs match evaluation in response to the second device 212 being within a certain proximity to the first device 210. The evaluation logic performing the evaluation may be located on the first and/or second device. Thus, in embodiments, when the two wristbands 210 and 212 are within close proximity of each other, profile information is exchanged between the first wristband 210 and the second wristband 210. The evaluation logic within each wristband can then perform a match comparison with its own local profile data and the profile data received from the neighboring participant.

Figure 3:
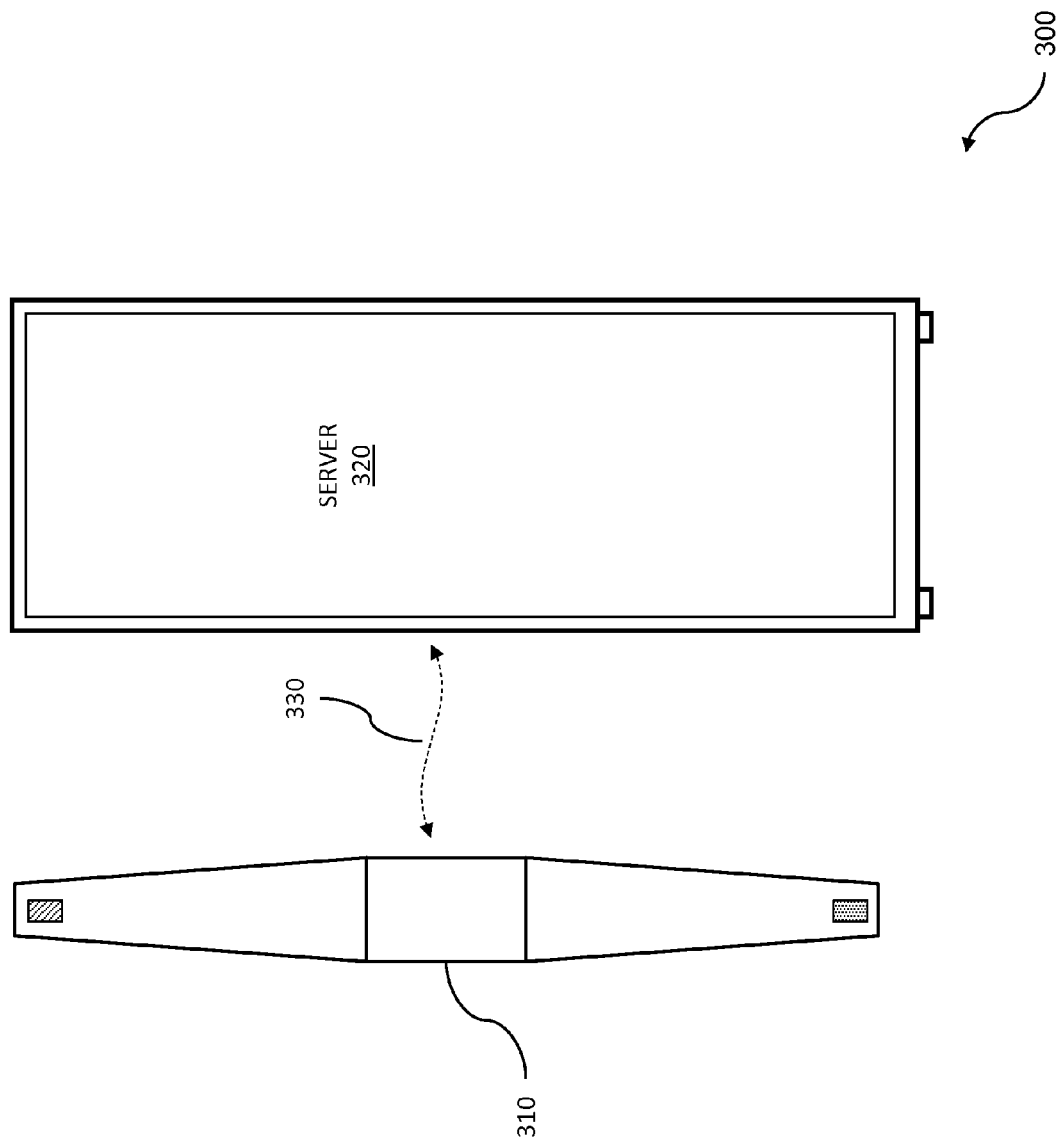
FIG. 3 illustrates wristband to server communication.

FIG. 3 is a diagram 300 illustrating wristband to server communication. In embodiments, a wristband 310 wirelessly communicates with a server 320 over a communications link 330. The communications link 330 can include Wi-Fi, Bluetooth®, or other suitable technology. The wristband 310 can include a Wi-Fi transceiver to communicate with the server 320, which can be stationed locally (e.g. within the same room as the social event). In other embodiments, the wristband 310 has internet capability, and communicates with the server 320 via the internet. In such embodiments, the server 320 can be located remotely (e.g. in another city or even country). The server 320 can manage user profiles, the association of profiles with users, and/or the association of users with devices (e.g. wristbands). Potential matches can be evaluated and stored on the server computer and the potential matches can be used in determining the match. Thus, in embodiments, the server 320 performs some or all of the match evaluations a priori. For example, as users enter profile data, the server 320 can compare the data being entered with data previously entered by other users to identify matches between multiple users. The wristband 310 can also perform evaluation of match criteria. In some embodiments, the wristband 310 can perform coarse matching evaluation, while the server, with access to additional profile data, can perform fine matching evaluation. For example, the evaluation of the correspondence of a number of main profile questions between two or more users can be evaluated on the wristband 310 during wristband-to-wristband communication as part of a so called coarse match evaluation. Once a coarse match (a preliminary match) is determined to exist, additional match evaluation on the server can be executed to determine a fine match evaluation. As an example of coarse match evaluation, the wristband-to-wristband communication can evaluate the correspondence of users' responses to three questions as in the previously described example. A match on one or more of the questions can trigger a fine evaluation on the server, where many more profile questions can be matched (e.g. 20 or more detailed profile questions). If the fine match evaluation indicates a degree of matching, the server 320 communicates the results of the evaluation to the wristband 310. The wristband 310 can then provide an indication of the fine match to the wearer in the form of illuminating a colored light on the wristband 310. Note that while the aforementioned description refers to a wristband, other devices, such as electronically enabled beverage holders, can be used in place of, or in addition to, wristbands.

Figure 4:
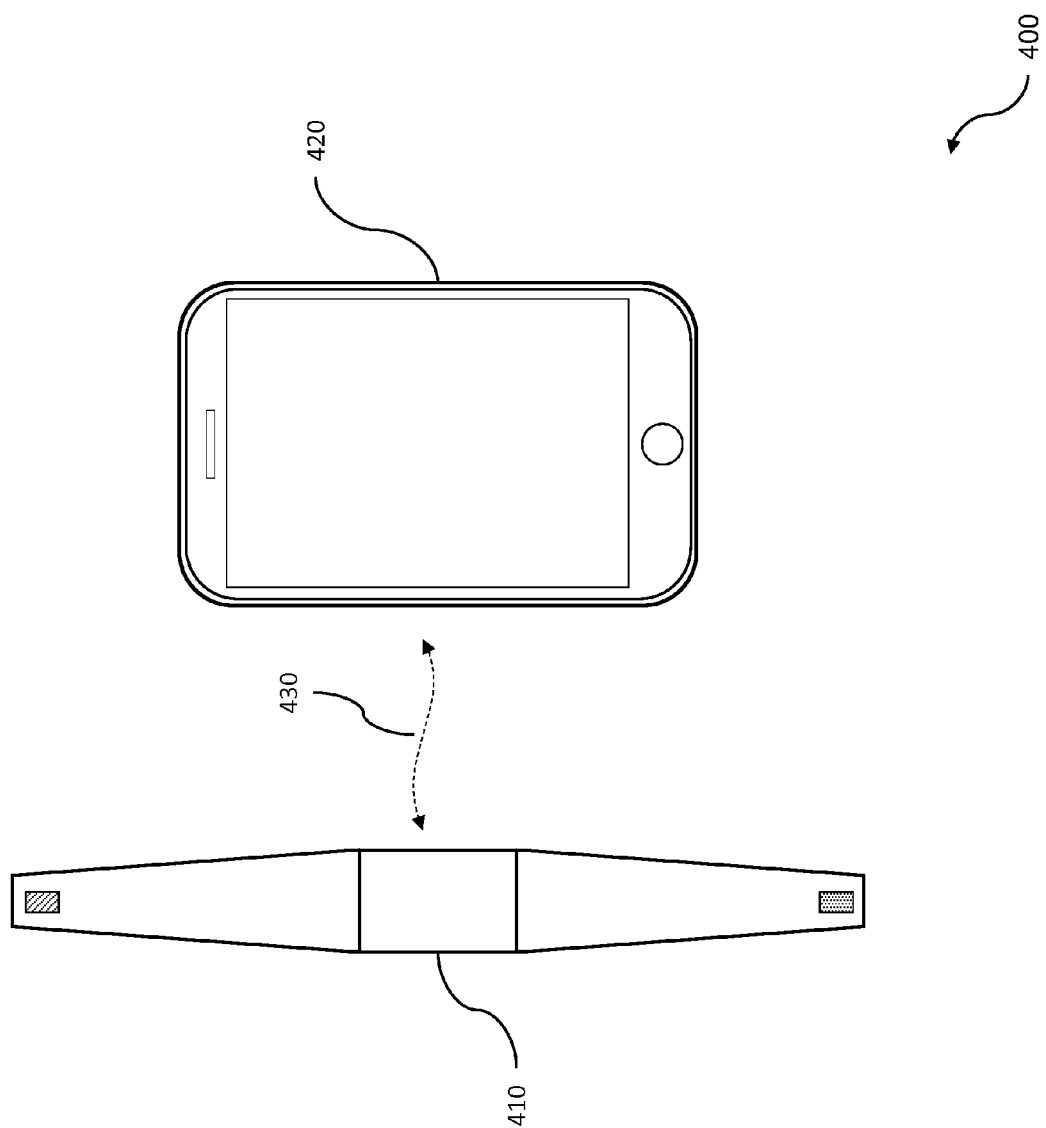
FIG. 4 illustrates wristband to smartphone communication.

FIG. 4 is a diagram 400 illustrating wristband to smartphone communication. In the embodiment shown, the wristband 410 is paired with, and communicates with a smartphone 420 using a wireless communication link 430. In embodiments, the wireless communication link 430 comprises a Bluetooth® link. In some embodiments, information is exchanged between the wristband 410 and the smartphone 420 or another mobile device. The exchanged information can include contact information. In embodiments, contact information from a first participant can be transmitted from the first participant's smartphone to the first participant's wristband in response to a match between neighboring participants, and then from the second participant's wristband to the second participant's smartphone in response to the same detected match. The first mobile device and the second mobile device can communicate wirelessly with one another. Thus, in some embodiments, the contact information is transmitted directly between the two users' smartphones (or other suitable mobile devices). In this way, a first device (e.g. the wristband 410) can communicate with a first mobile device (e.g. the smartphone 420) and a second device can communicate with a second mobile device.

An application ("app") running on the smartphone 420 can facilitate sending and receiving contact information on the smartphone, as well as storing the contact information in the user's contact list on the smartphone. In this way, when users meet other participants who are deemed to represent a match, contact information can be automatically exchanged and stored in each user's contact list on their respective smartphones. In some embodiments, additional contact metadata can also be stored along with the contact information. The contact metadata can include, but is not limited to, the time and date that the contact information was stored, and the location where the neighboring participants made a connection. The metadata can be useful in helping a user to remember the identity of the person associated with the contact information. Note that while the aforementioned explanation pertains to wristbands, other devices, such as electronically enabled lapel pins and/or electronically enabled beverage holders, can also be used. In some embodiments using smartphones, the aforementioned profile questions can be presented to the user on directly on their smartphone, eliminating the need for a local kiosk computer.

Figure 5:
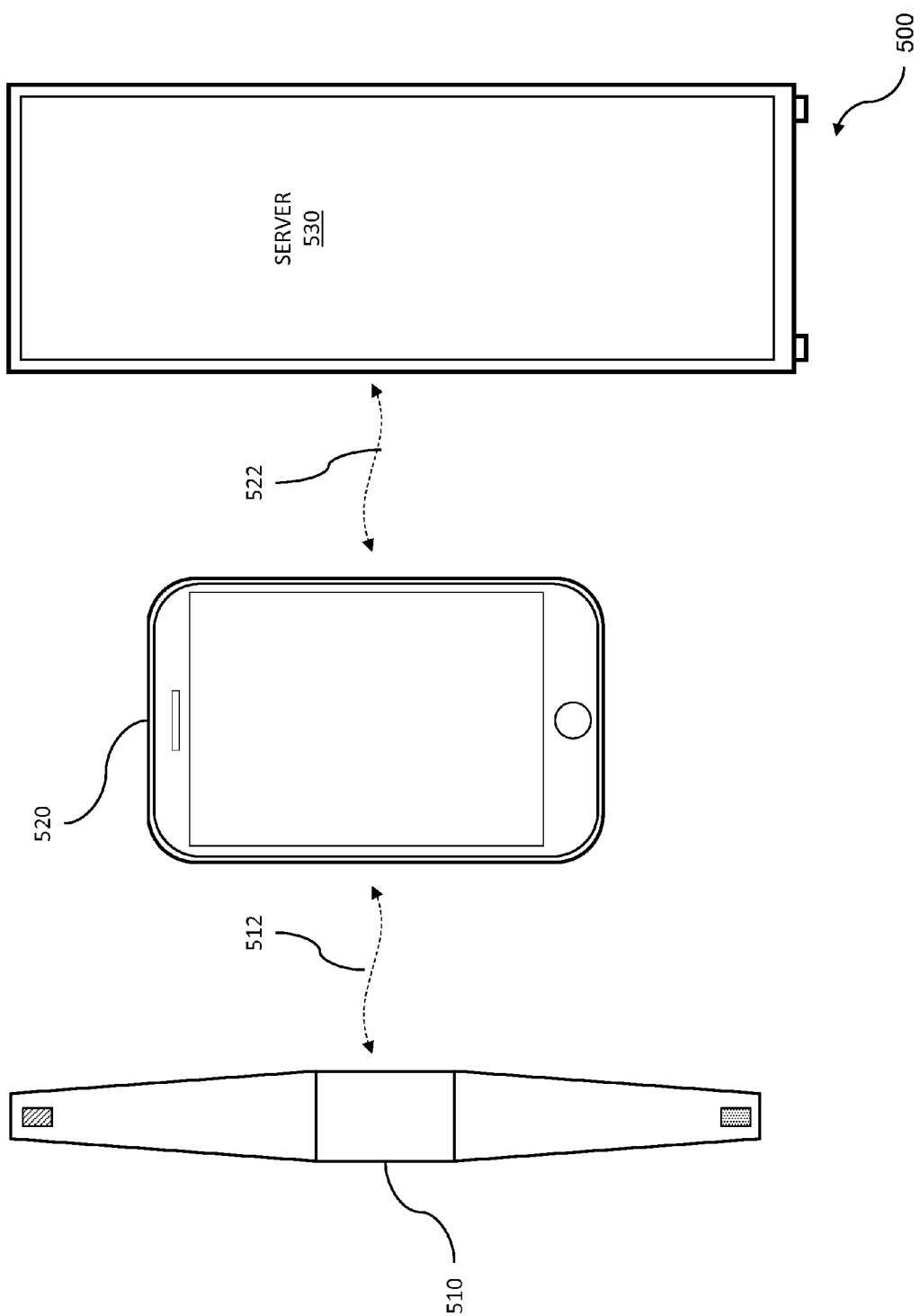
FIG. 5 illustrates wristband to smartphone to server communication.

FIG. 5 is a diagram 500 illustrating wristband to smartphone to server communication. In the embodiment shown, a wristband 510 communicates with a smartphone 520 or another mobile device using a wireless communication link 512. The wireless communication link 512 can comprise a Bluetooth® link. The smartphone 520 can communicate with a server 530 using a wireless communication link 522. In embodiments, the wireless communication link 522 includes a Wi-Fi link. In this configuration, information from the wristband 510 can be sent to the server 530 via the smartphone 520. This embodiment facilitate the use of a low-cost wristband 510, as the wristband 510 need only communicate with the smartphone 520 using Bluetooth® or another suitable near-field technology, eliminating the need for a cellular or Wi-Fi transceiver within the wristband 512. Removing the necessity for expensive integrated receivers can allow for the implementation of a disposable wristband 512 that can be economically given away at a social gathering such as a large conference but which still provides powerful matching services. In this embodiment, the comparing is accomplished on the server computer 530. Alternatively, the comparing (evaluating for a match) can be performed across multiple entities. For example, in some embodiments, the match is evaluated on the wristband 510, the smartphone 520, and the server 530. As previously noted, a coarse match evaluation can be performed on the wristband 510, but the inclusion of a smartphone means that a mid-level match can be performed on the smartphone 520, while a fine match can still be performed on the server 530. For example, while a coarse match can include the fact that both participants like sports, a mid-level match can further evaluate various types of sports to find a common sport interest (e.g. baseball), and a fine match can further evaluate baseball interests to find particular matching interests within baseball (e.g. Red Sox, Fenway Park, etc.). In some cases, the comparing is accomplished on a mobile device in communication with the wristband or similar device.

Figure 6:
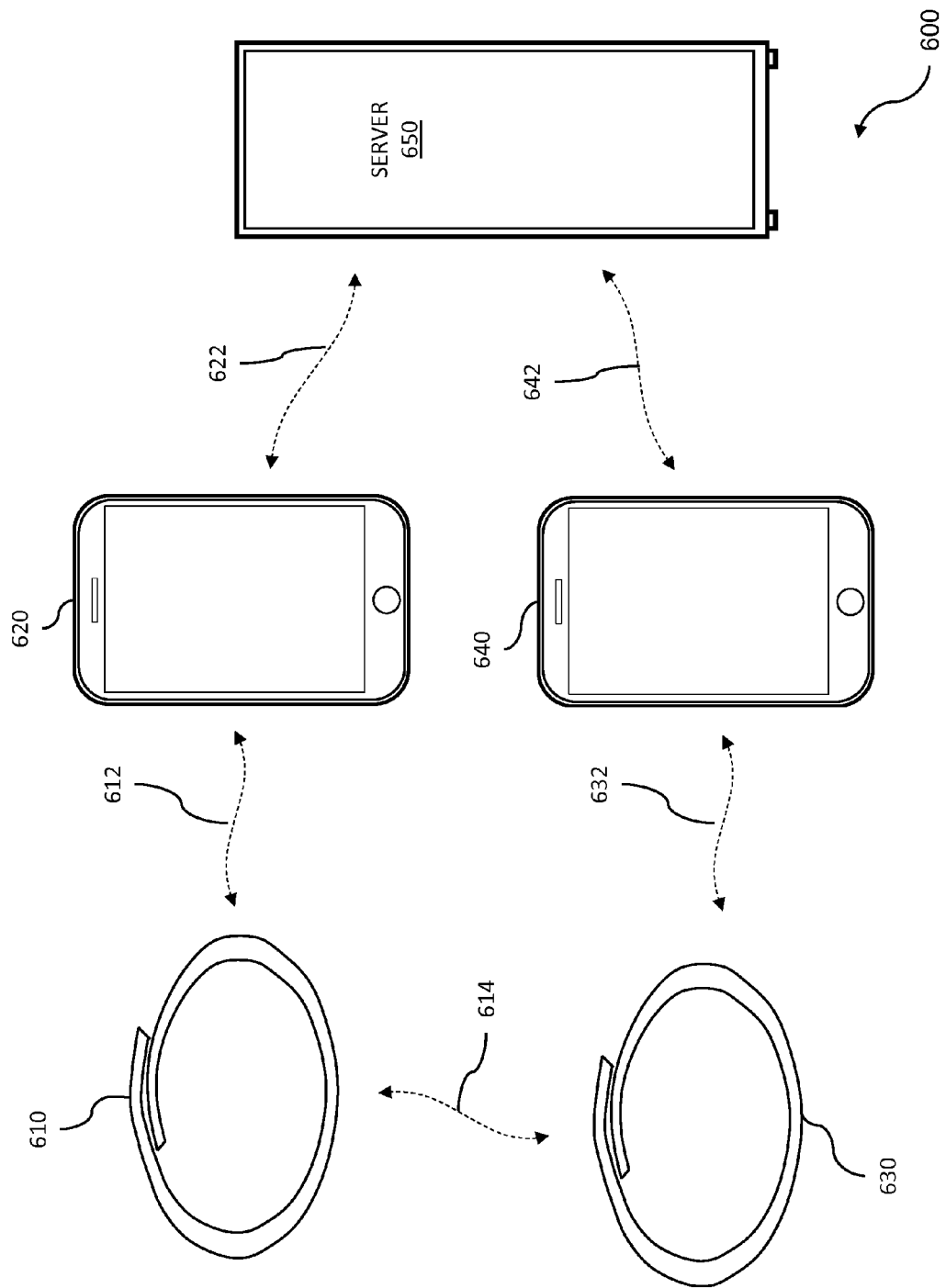
FIG. 6 illustrates wristband to wristband communication via a server.

FIG. 6 is a diagram 600 illustrating wristband to wristband communication via a server. The diagram 600 includes a first wristband 610 and a second wristband 630. The first wristband 610 communicates with a first smartphone 620 or another mobile device via a first wireless link 612 which can comprise a Bluetooth® link. In exemplary usage, the first wristband 610 is worn on the right wrist of a user, and the first smartphone 620 is kept in a pocket or purse in close proximity to the user or first participant. Thus, the first wristband 610 can send and receive information to and from the first smartphone 620. The first smartphone 620 can communicate with a server computer 650 via a first server-to-smartphone wireless communication link 622. In embodiments, the wireless link 622 comprises a Wi-Fi link. Similarly, a second wristband 630 can be worn on a wrist of a second participant, and a second smartphone 640 can kept in a pocket or purse of the second participant. The second wristband 630 and the second smartphone 640 can communicate via a second wireless link 632, which can comprise a Bluetooth® link. Furthermore, the second smartphone 640 can communicate with the server 650 via a second server-to-smartphone wireless link 642, which can include a Wi-Fi link. In this way, the first mobile device 620 can communicate with the server computer 650 and the second mobile device 640 can also communicate with the server computer 650.

In addition, the first wristband 610 can communicate directly with the second wristband 630 via a direct wireless link 614. In embodiments, the direct wireless link 614 is an infrared link. In other embodiments, the direct wireless link 614 comprises an ANT+™ link, Bluetooth® link, or a near field communications link directly linking the two wristbands in an ad-hoc or device-to-device configuration. In embodiments, the device-to-device (wristband-to-wristband) link is used for detecting the proximity of the devices and enabling the devices to make a connection. The establishing of a connection between the first 610 and second wristband 630 can include each wristband exchanging identification information over the direct wireless link 614. The connection process can include a discovery phase, where the first wristband 610 detects that another wristband is nearby. In embodiments, each wristband periodically sends out a beacon signal. In some embodiments, upon detecting a beacon signal each wristband provides a response. Information can then be exchanged between the two wristbands. The beacon signal can include device identification or user identification information. To signal the exchange of information, a haptic generator in each wristband can activate. This alerts each user to the fact that information is being exchanged between the two wristbands, and a match evaluation is in progress. The information includes an identifier, such as a unique number that is paired with a given user (participant). The unique identifier of the detected neighboring wristband can be communicated to server 650 via the user's smartphone as detailed above. In embodiments, the server 650 then determines the identity of the neighboring participant by associating the unique identifier of the detected neighboring wristband with a record (e.g. a database record) containing user profile information. The server 650 then can compare various attributes of the wearer and attributes of the detected neighboring participant to determine a match. If a match is determined, the server sends a match indication to each user's smartphone, which in turn communicates the match indication to the respective wristband. The respective wristbands each provide an indication of the match, such as illumination of a particular colored LED. While aforementioned examples illustrate two participants, any number of participants is possible. In embodiments, the server can obtain further information on the first person and further information on the second person. The server can then augment the profile information on the first person and the profile information on the second person depending on certain parameters and permissions provided to the server. The augmentation can be based on in-person interaction between the first person and the second person and can be based on duration of interaction information as well as other factors.

In some embodiments, the first mobile device 620 and the second mobile device 640 communicate wirelessly with one another. In such embodiments, contact information can be communicated directly from one smartphone or other mobile device to another. Contact information can also be exchanged via other techniques including such as devices directly communicate contact information, contact information is exchanged through remote computers (i.e. social networks), and the like. Embodiments can also include a group feature that accommodates a group of more than two participants. The system can comprise a third device, associated with a third participant, wherein the match evaluation further comprises enabling match evaluation between a person and the third participant and between the second, neighboring participant and the third participant. Thus, three or more participants can form a group, and in embodiments, various matching criteria amongst members of the group can be displayed on the wristbands of the participants. The third participant can be nearby the first participant and nearby the neighboring participant.

The device, such as the first wristband 610, can further comprise a proximity detector used to detect proximity to a second device associated with the neighboring participant. In embodiments, the proximity detector includes an infrared transceiver or a radio signal strength evaluation. Devices can periodically send out a beacon signal and listen for beacon signals from other nearby devices. In embodiments, devices (such as wristbands) can be configured to detect each other when they are less than 18 inches apart from one another. The first device and the second device can be in wireless communication with one another. The device can send an acknowledgement transmission to the second device based on detection of proximity between the device and the second device. In a group scenario with more than two devices, each device may communicate with other devices in the group.

Figure 7:
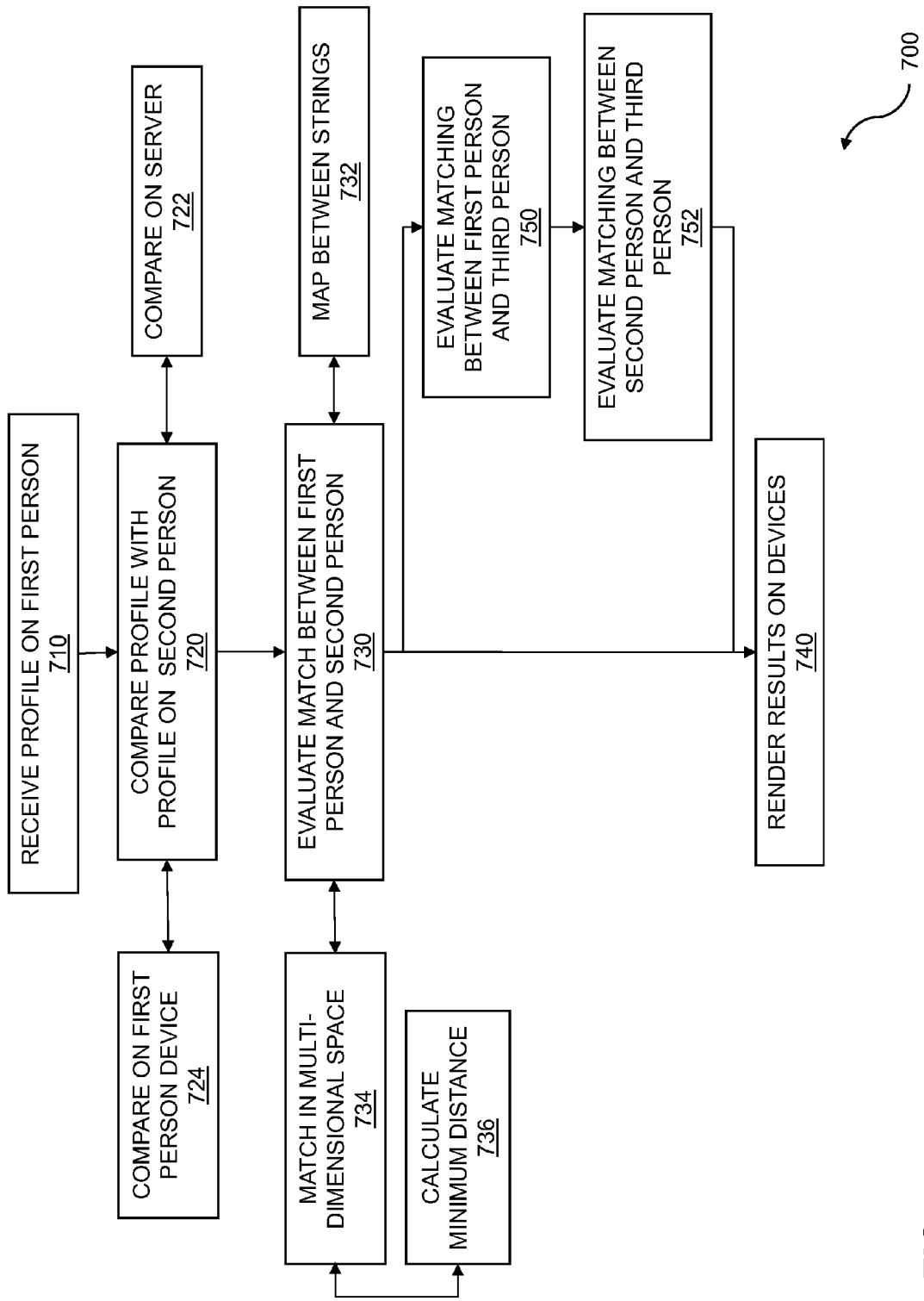
FIG. 7 is a flow diagram for social matching communication.

FIG. 7 is a flow diagram for social matching communication. The flow 700 comprises a processor-implemented method for communication. The flow 700 includes receiving profile information on a first person 710. The profile information can include scoring of a plurality of profile questions. The profile information can further include information such as profession, industry, area of residence (e.g. state, city, etc.), demographic information, professional group membership information, and/or college alumni information. The flow 700 further includes comparing the profile information on the first person with profile information on a second person 720. The comparison can include comparing the ranking (scores) associated with a profile of the first person with the corresponding ranking associated with a profile of the second person. The ranking can include a score for each question of a plurality of questions. The flow 700 continues with evaluating a match between the first person and the second person 730, based on the comparing. The comparison can include multi-dimensional space matching. In embodiments, the matching includes computing the absolute value of the difference between each individual score and summing them to form a match value. In such an embodiment, a lower match value indicates a closer match between the first person and the second person. The comparing can be accomplished on a device associated with the first person 724. Alternatively, the comparing can be accomplished on a server 722. In some embodiments, a distance-based comparison is used. For example, in five-dimensional space, a formula such as $\sqrt{(Q1A-Q1B)^2 + \ldots + (Q5A-Q5B)^2}$ can be used to compute a distance between two users. After determining the distance between two users, some embodiments illuminate a colored light corresponding to the question with highest ratings between those two devices, or establish a profile distance threshold above which the lights would give a positive match feedback. In embodiments, the profile information on the first person can be gleaned or augmented from a plurality of social networks. This information can be combined via a weighted combination of components from the social networks. For instance, in a business environment, a LinkedIn™ information may be deemed valuable while in a social setting Facebook™ information may be deemed valuable and the weighting therefore emphasized accordingly. A weight therefore can be associated with a certain social network and another weight factor is associated with a category within the certain social network. For instance, information personally written by the person can carry a higher weight while information obtained in a news feed would carry, and therefore be weighted, with a lower weight.

The profile information on the first person and the profile information on a second person can be binary strings and the evaluating a match can involve direct mapping between the binary strings 732. This technique can be used when users enter yes/no responses to profile questions. The evaluating of the match can be based on multi-dimensional space matching 734. This technique can be used when users enter numerical values as responses to profile questions, where the numerical values indicate the amount of agreement with the question. The multi-dimensional space matching can include calculating a minimum distance 736 across the multi-dimensional space between the first person and the second person. That is, in such embodiments, a minimum distance between each question is calculated. In groups with more than two people, the process can be repeated with other members of the group. For example, with a group of three people, the flow can include evaluating matching between the first person and third person 750, as well as evaluating matching between the second person and the third person 752. In some embodiments, the match has a temporal component. That is, if two devices have been in close proximity to each other for more than a predetermined amount of time, then a temporal match is formed, and contact information is exchanged in the same manner as if there were a match based on one or more profile questions. For example, if two devices are in proximity to each other for over twenty minutes during the course of an hour, the devices can be deemed to match, initiating an exchange of contact information.

In other embodiments, additional profile information can be used to form the match. For example, by retrieving profile information from a travel website such as TripAdvisor®, a list of cities visited by different users can be obtained. The match can be formed based on travels to similar destinations by the two participants.

The flow 700 can include rendering results, based on the evaluating of the match, on a plurality of devices 740 in wireless communication with each other where a first device, from the plurality of devices, is in close contact with the first person and a second device, from the plurality of devices, is in close contact with the second person and where the first device and the second device are within proximity of one another and where the first device and the second device exchange data. Close contact can be used to refer to the distance between a user and his or her corresponding device. Proximity can be used to refer to the distance between two devices. The rendering of results can include illuminating one or more colored lights. In some embodiments, the wristband can include a display screen capable of rendering alphanumeric information and/or graphical images. In such embodiments, text and/or images can be rendered to indicate a match. For example, if both users like baseball, then a baseball icon can be displayed on each wristband.

The flow 700 can include a computer program product embodied in a non-transitory computer readable medium for communication comprising: code for receiving profile information on a first person; code for comparing the profile information on the first person with profile information on a second person; code for evaluating a match between the first person and the second person, based on the comparing; and code for rendering results, based on the evaluating of the match, on a plurality of devices in wireless communication with each other where a first device from the plurality of devices is in close contact with the first person and a second device from the plurality of devices is in close contact with the second person and where the first device and the second device are within proximity of one another. Various steps in the flow 700 may be changed in order, repeated, omitted, or the like without departing from the disclosed concepts. Various embodiments of the flow 700 may be included in a computer program product embodied in a non-transitory computer readable medium that includes code executable by one or more processors.

Figure 8:
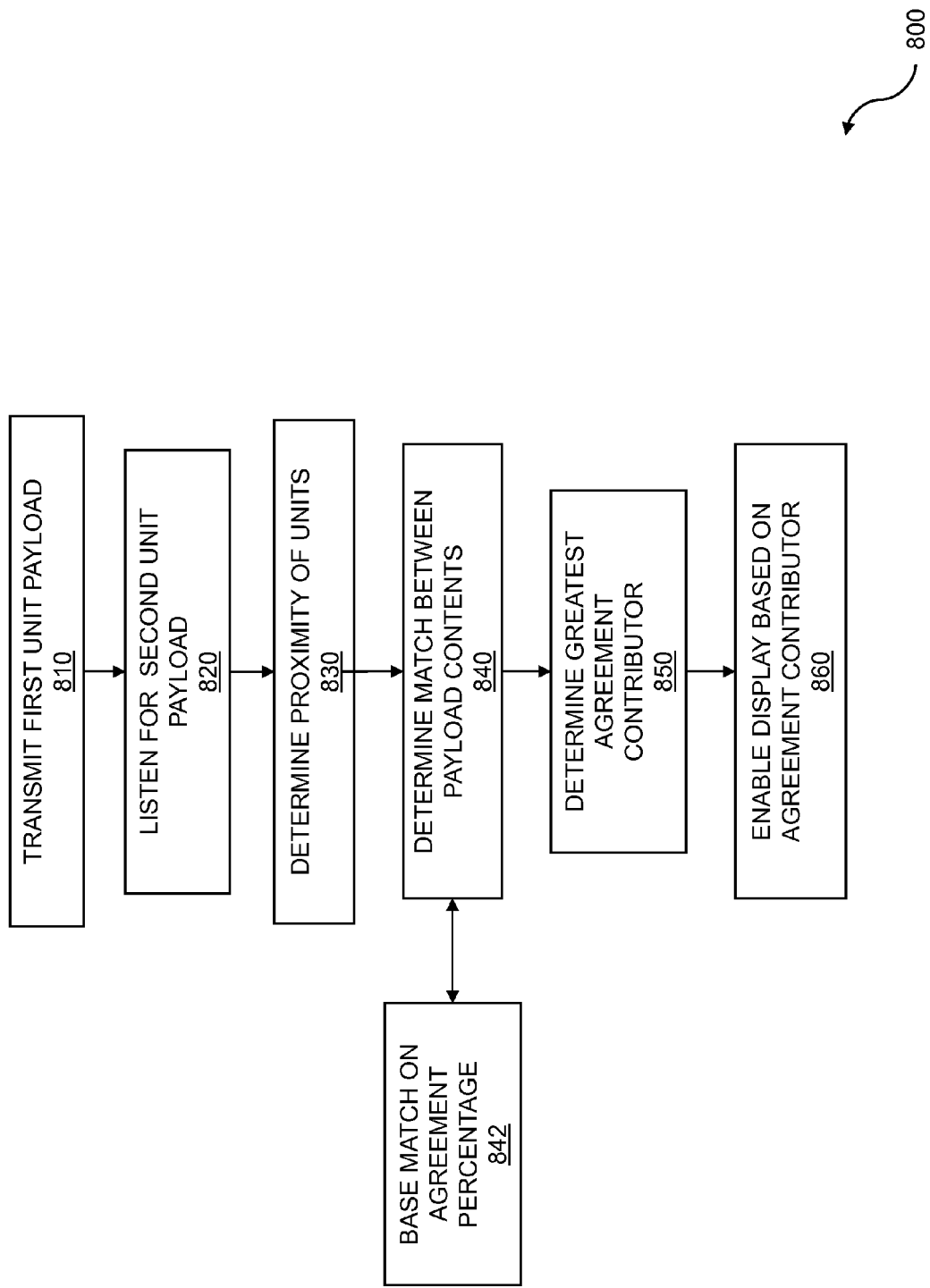
FIG. 8 is a flow diagram for match evaluation.

FIG. 8 is a flow diagram 800 for match evaluation. The flow 800 starts with transmitting a first unit payload 810. The wireless transceiver of a first device can receive an eight-byte payload and two-byte hardware identifier from a second device or a user identification. The eight-byte payload can comprise five bytes of profile information. The remaining three bytes can be used for transmitting a group identifier (group ID) and a control byte to signify that the rest of the payload contains matching information. In the case of binary strings, a five-byte string can accommodate up to 40 yes/no responses. The flow continues with listening for second unit payload 820. The second unit payload can come from a device (e.g. wristband) of a neighboring participant, where the device is in close proximity to the device that transmitted the first unit payload. The flow continues with determining the proximity of units 830. If the wireless link for device-to-device communication (e.g. direct wireless link 614 of FIG. 6) is designed for short-range transmission, then receiving data over the link infers a device in close proximity. In other embodiments, radio signal strength information is evaluated and a proximity is thereby determined. The flow continues with determining a match between payload contents 840. The determination can base a match on agreement percentage 842. For example, in a binary string embodiment with ten bits, if there is at least 70% agreement (e.g. 7 out of 10 bits agree between the two users), then a match can be indicated. The flow continues with determining the greatest agreement contributor 850. The determining can include determining which profile question was in closest agreement between the two users. The flow continues with enabling the display based on the agreement contributors 860. The enabling of the display can include illuminating one or more colored lights, with each light corresponding to a profile question. Various steps in the flow 800 may be changed in order, repeated, omitted, or the like without departing from the disclosed concepts. Various embodiments of the flow 800 may be included in a computer program product embodied in a non-transitory computer readable medium that includes code executable by one or more processors.

Figure 9:
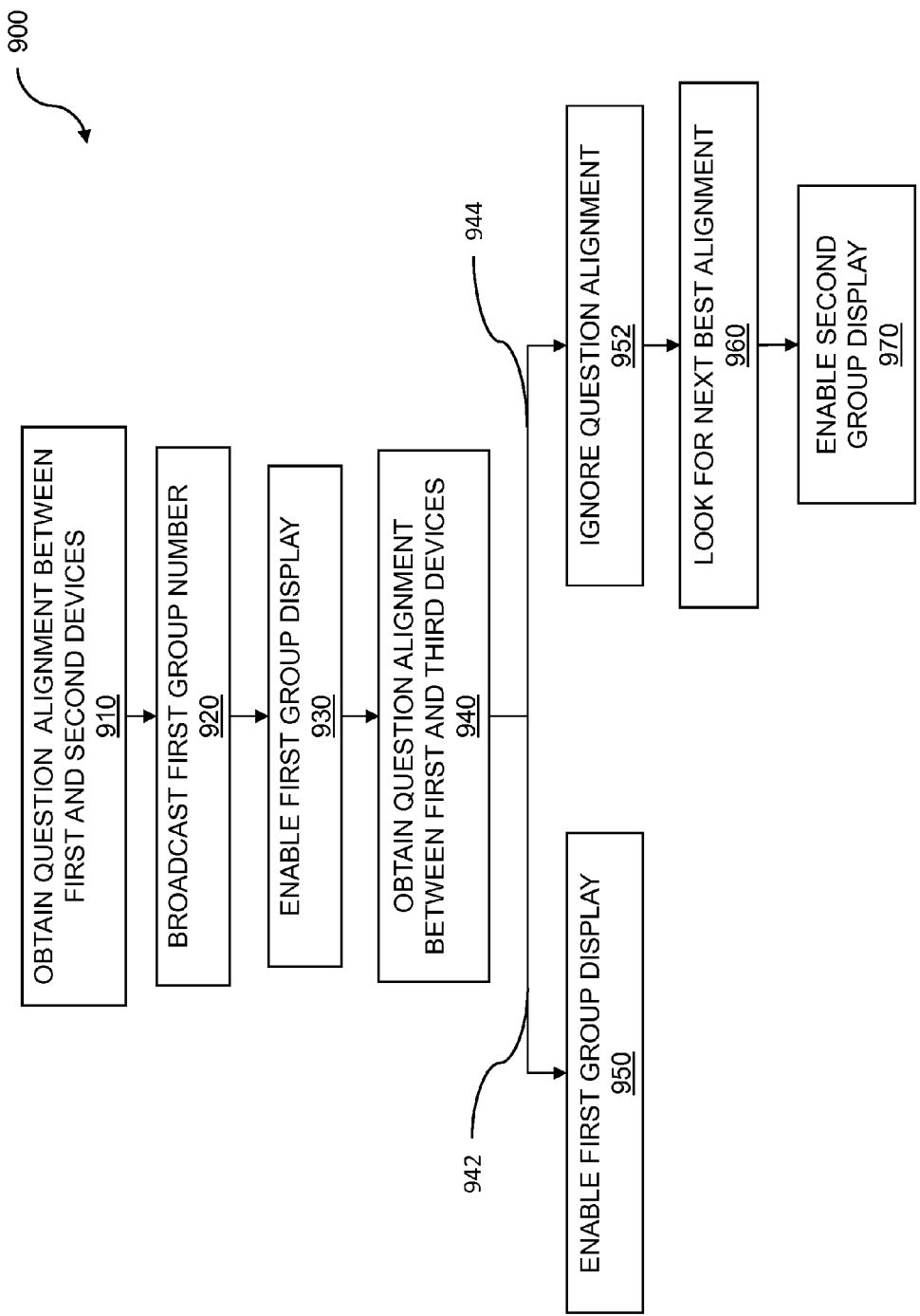
FIG. 9 is a flow diagram for group matching scenarios.

FIG. 9 is a flow diagram 900 for group matching scenarios. The flow starts with obtaining question alignment between first and second devices 910. In embodiments, the questions from which alignment is obtained include a measure of 0-100% agreement with a set of questions and/or a list of responses to Boolean questions. The flow continues with broadcasting a first group number 920. The group number can correspond to an ordinal number of the first question for which a match has been found. For example, if a particular device detects a match with a neighboring participant device on question Q3, then the first device can broadcast a group ID corresponding to this question. If another device joins the group the joining device looks for devices with which agreement is shared on the response to the question corresponding to the group ID of at least two or more devices already within the group (assuming that the group contains more than one prior member). This prevents colored light indications that could potentially cause confusion when more than two devices are present. An example of group (more than two devices) operations is as follows:

Device X sees other devices and finds device Y to be its best match. Since devices X and Y have a certain question (question 1) in common at high percentage, both devices illuminate a red LED. At the same time, device W finds device Z to be its best match as devices W and Z have a certain question (question 2) in common at high percentage. Thus, both devices illuminate a green LED. Next, device K shows up and enters the group and determines a best match with device X. However, the particular profile question for which devices K and X match is a third question (question 3), a match not yet shared by any current group members. Remember that device X is currently showing a red LED which is device X's current matching state. If device K lit a blue LED in response to matching device X on question 3, it would be the only blue device in the circle, with the lack of a corresponding blue match causing confusion amongst the users.

Embodiments solve this problem using a group ID. Every time a device matches with another device, it starts broadcasting a group identification (group ID) number which corresponds to the different questions (question 1=group 1, question 2=group 2, and so on). In this example, device K finds that X is a good match on group 3, but since X is broadcasting that it is in group 1, device K ignores device X. Device K then looks for the next best match within 'visible range' that it can detect. Device K iterates through the list of potential matches until it finds a matching profile that also corresponds to a previously established group. In this way, the colored lights still have a clear meaning to each user and clearly delineate subgroups within a larger group setting.

The flow continues with enabling the first group display 930. The enabling can include illuminating the light corresponding to the group ID. The flow then continues with obtaining question alignment between first and third devices 940. The obtaining can include finding a matching question between a device and a neighboring participant device that also matches the group ID of the neighboring participant device. The flow can continue along branch 942 with enabling the first group display 950. The enabling updates the display to indicate the presence of a group match. In embodiments, the enabling is accomplished by illuminating two colored lights simultaneously. For example, the simultaneous illuminating of two lights allows multiple devices in a group to illuminate different colors at the same time while also preventing any single device from illuminating only a single color by itself. Using multiple lights on a device allows for more possible matches to be indicated.

The flow can, after obtaining question alignment 940, continue along branch 944 to ignore the question alignment 952. The ignoring can happen when a device finds a neighboring device with agreement on a given profile question, but the question number does not match the group ID of the neighboring device. In such a case, the agreement is ignored to avoid disabling lights corresponding to current matches, thereby causing a confusing display in a group (more than two devices) environment. The flow then proceeds to look for the next best alignment 960. The searching can be accomplished by iterating through the list of potential matches until the device finds a matching profile that also has agreement to a question that corresponds to the group ID. That is, in embodiments, the next best alignment is determined by identifying a neighboring participant device with an agreement question whose ordinal number is the same as the number of the group ID. If no such device can be found, then no match is indicated. The flow then continues to enabling the second group display 970.

The diagram 900 can further comprise evaluating matching between the first person and a third person and evaluating matching between the second person and a third person. Furthermore, embodiments are extendable to beyond three participants, and may include four or more participants. Various embodiments of the device (e.g. wristband) have additional LEDs to provide more possible color combinations to facilitate indication of multiple matches. For example, a wristband can have three banks of LEDs that include a first bank with three blue LEDs, a second bank with three red LEDs, and a third bank with three green LEDs. Each bank can correspond to a profile question. Furthermore, each bank can have a right, middle, and left LED that can be illuminated to form a pattern. The patterns can be used to identify matching participants. Other embodiments can have more or fewer LED banks, with more or fewer LEDs per bank. Furthermore, additional colors (e.g. white, orange, yellow, etc.) can be used to facilitate more possible light patterns to be used for matching. Various steps in the flow 900 may be changed in order, repeated, omitted, or the like without departing from the disclosed concepts. Various embodiments of the flow 900 may be included in a computer program product embodied in a non-transitory computer readable medium that includes code executable by one or more processors.

Figure 10:
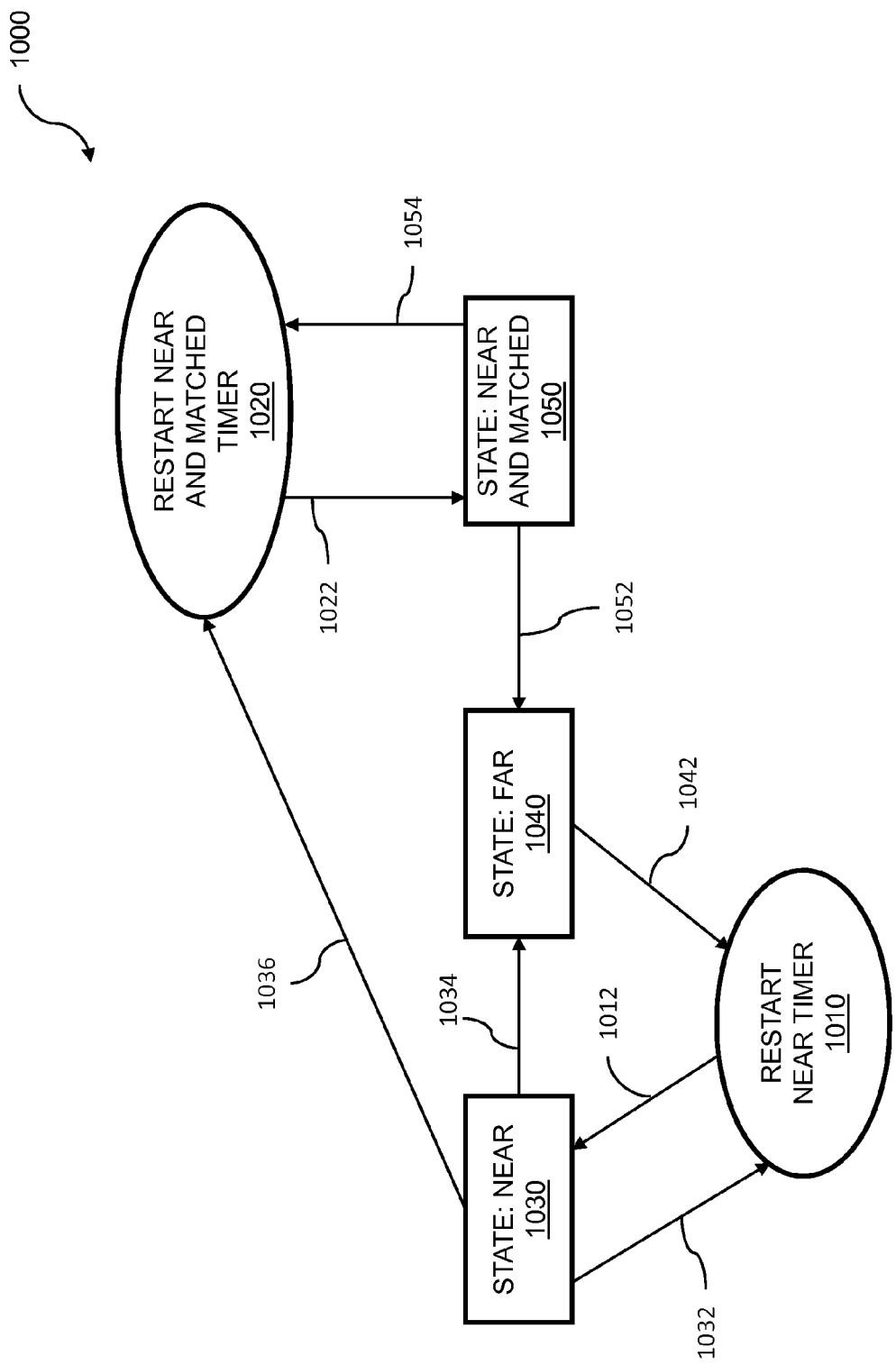
FIG. 10 is a state transition diagram showing example matching for a device.

FIG. 10 is a state transition diagram 1000 for a device showing example matching. When a unit receives a transmission from a nearby unit, a near timer is restarted 1010. In embodiments, the timer can be set to an expiration period of about 1.8 seconds. When the timing is restarted, the unit is placed into the near state 1030 via path 1012. When the timer expires, the state transitions via a path 1034 to a far state 1040. If while at near state 1030 a non-matching message is received, the state transitions via a path 1032 back to restarting the near timer. If a matching message is received while in the near state, the state transitions via path 1036 to restart a near and matched timer 1020, and then proceeds via a path 1022 to a near and matched state 1050.

If while at the near and matched state 1050 a matching message is received, the state transitions via a path 1054 to restart the near and matched timer 1020. If while at the near and matched state 1050 the near and matched timer elapses, the state proceeds via a path 1052 to a far state 1040. If while at the far state 1040 a non-matching message is detected, the state proceeds via a path 1042 to restart the near timer 1010.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. An apparatus for communication comprising:
a device associated with and in close proximity with a first participant comprising:
  a wireless transceiver;
  a display coupled to the wireless transceiver where the display renders information about a neighboring participant;
  evaluation logic coupled to the wireless transceiver that enables match evaluation between a person and the neighboring participant based on profile related information received via the wireless transceiver, wherein the evaluation logic only performs match evaluation in response to a second device being within a certain proximity to the device
  wherein the evaluation logic enables match evaluation based on:
    receiving the profile information on the person;
    comparing the profile information on the first participant with profile information on the neighboring participant, wherein the comparing is accomplished on the device associated with the first participant, and wherein the profile information on the first participant and the profile information on a neighboring participant are binary strings, wherein the comparing is further accomplished using a server computer, wherein the server computer obtains further information on the first participant and further information on the neighboring participant and augments the profile information on the first participant and the profile information on the neighboring participant based on in-person interaction between the first participant and the neighboring participant, and wherein the in-person interaction includes duration of interaction information;
    evaluating and storing, on the server computer, a potential match;
    evaluating a match between the first participant and the neighboring participant, based on the comparing, wherein the evaluating a match involves direct mapping between the binary strings, and wherein the potential match is used in the evaluating of the match between the first participant and the second participant; and
    rendering results, based on the evaluating of the match, on a plurality of devices in wireless communication with each other where a first device, from the plurality of devices, is in close contact with the first participant and a second device, from the plurality of devices, is in close contact with the neighboring participant and where the first device and the second device are within proximity of one another and where the first device and the second device exchange data; and
  display logic that enables rendering of the match evaluation on the display.

2. The apparatus of claim 1 wherein the information about the neighboring participant includes commonality information.

3. The apparatus of claim 1 wherein the display comprises a plurality of colored lights.

4. The apparatus of claim 1 wherein the evaluation logic uses profile information received via the wireless transceiver.

5. The apparatus of claim 1 wherein the second device is associated with the neighboring participant.

6. The apparatus of claim 1 further comprising a third device, associated with a third participant, wherein the match evaluation further comprises enabling match evaluation between the person and the third participant and between the neighboring participant and the third participant.

7. The apparatus of claim 6 wherein the third participant is nearby the first participant and nearby the neighboring participant.

8. The apparatus of claim 1 wherein the device further comprises a haptic actuator that provides haptic feedback to the first participant.

9. The apparatus of claim 1 wherein the device and a second device associated with the neighboring participant communicate via radio.

10. The apparatus of claim 1 wherein the wireless transceiver receives an eight-byte payload and two byte hardware identifier from a second device.

11. The apparatus of claim 10 wherein the eight-byte payload comprises five bytes of profile information.

12. The apparatus of claim 1 wherein the device further comprises a proximity detector to a second device associated with the neighboring participant.

13. The apparatus of claim 1 further comprising a biometric sensor where information from the biometric sensor is communicated with the neighboring participant.

14. A processor-implemented method for communication comprising:
receiving profile information on a first person;
comparing the profile information on the first person with profile information on a second person, wherein the comparing is accomplished on a device associated with the first person, and wherein the profile information on the first person and the profile information on a second person are binary strings, wherein the comparing is further accomplished using a server computer, wherein the server computer obtains further information on the first person and further information on the second person and augments the profile information on the first person and the profile information on the second person based on in-person interaction between the first person and the second person, and wherein the in-person interaction includes duration of interaction information;
evaluating and storing, on the server computer, a potential match;
evaluating a match between the first person and the second person, based on the comparing, wherein the evaluating a match involves direct mapping between the binary strings, and wherein the potential match is used in the evaluating of the match between the first person and the second person; and
rendering results, based on the evaluating of the match, on a plurality of devices in wireless communication with each other where a first device, from the plurality of devices, is in close contact with the first person and a second device, from the plurality of devices, is in close contact with the second person and where the first device and the second device are within proximity of one another and where the first device and the second device exchange data.

15. The method of claim 14 wherein the data which is exchanged between the first device and the second device communicates proximity information and an identifier.

16. The method of claim 14 wherein the first device includes a band for wrapping around a cup.

17. The method of claim 14 wherein the rendering results facilitates in-person interaction.

18. The method of claim 14 wherein the comparing is accomplished on a mobile device in communication with the first device.

19. The method of claim 14 wherein the first device and the second device are in wireless communication with one another.

20. The method of claim 19 wherein the first device communicates with a first mobile device and the second device communicates with a second mobile device.

21. The method of claim 20 wherein the first mobile device and the second mobile device communicate wirelessly with one another.

22. The method of claim 20 wherein the first mobile device communicates with a server computer and the second mobile device communicates with the server computer.

23. The method of claim 14 wherein the evaluating the match is based on multi-dimensional space matching.

24. The method of claim 23 wherein the multi-dimensional space matching includes calculating a minimum distance across the multi-dimensional space between the first person and the second person.

25. The method of claim 14 wherein the profile information on the first person and the profile information on a second person is based on social network information.

26. The method of claim 25 wherein the profile information on the first person is gleaned from a plurality of social networks and a weighted combination of components from the plurality of social networks is used in the evaluating where a weight is associated with a certain social network and another weight is associated with a category within the certain social network.

27. The method of claim 14 further comprising evaluating matching between the first person and a third person and evaluating matching between the second person and a third person.

28. A system for communication comprising:
a first device associated with a first participant; and
a second device associated with a second participant wherein:
the first device and the second device exchange profile information on the first participant and the second participant, in response to the first device and the second device being in proximity to one another;
the first device and the second device perform evaluation of a match between the first participant and the second participant based on the profile information that was exchanged, wherein the evaluation is only performed in response to a second device being within a certain proximity to the first device and wherein the evaluation is based on:
receiving profile information on a first participant;
comparing the profile information on the first participant with profile information on a second participant, wherein the comparing is accomplished on the first device associated with the first person, and wherein the profile information on the first participant and the profile information on a second participant are binary strings, wherein the comparing is further accomplished using a server computer, wherein the server computer obtains further information on the first participant and further information on the second participant and augments the profile information on the first participant and the profile information on the second participant based on in-person interaction between the first participant and the second participant, and wherein the in-person interaction includes duration of interaction information;

evaluating and storing, on the server computer, a potential match;

evaluating a match between the first participant and the second participant, based on the comparing, wherein the evaluating a match involves direct mapping between the binary strings, and wherein the potential match is used in the evaluating of the match between the first participant and the second participant; and rendering results, based on the evaluating of the match, on a plurality of devices in wireless communication with each other where the first device, from the plurality of devices, is in close contact with the first participant and the second device, from the plurality of devices, is in close contact with the second participant and where the first device and the second device are within proximity of one another and where the first device and the second device exchange data; and the first device and the second device render results of the evaluation of a match.

* * * * *